G. W. PUFF.
HEADLIGHT LENS.
APPLICATION FILED OCT. 24, 1917.
1,275,304.
Patented Aug. 13, 1918.
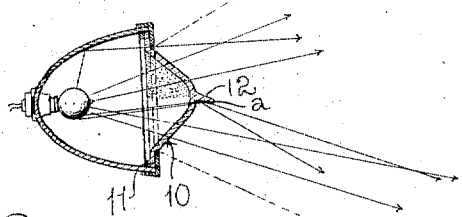
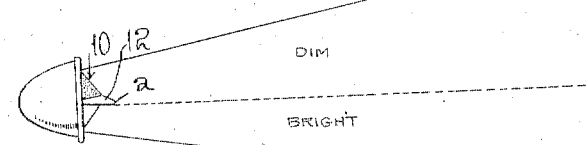
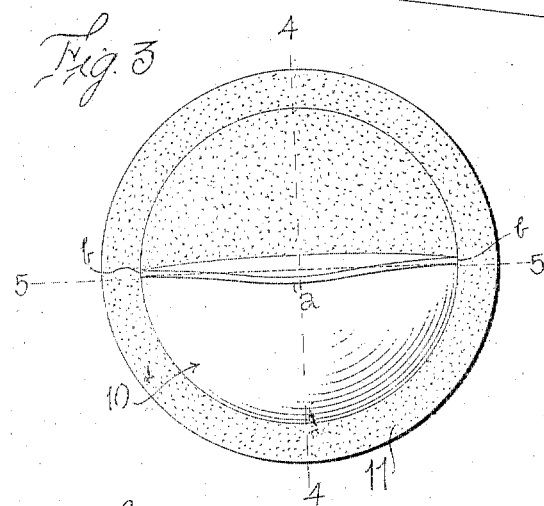
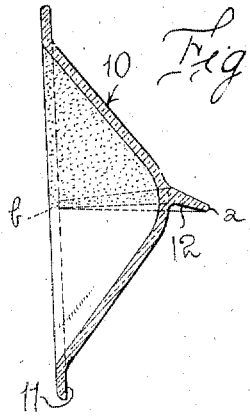
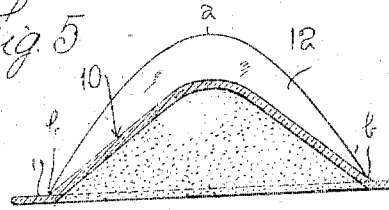
Inventor
GEORGE W. PUFF
By Watson E. Coleman
Attorney

UNITED STATES PATENT OFFICE.

GEORGE W. PUFF, OF JEANNETTE BOROUGH, PENNSYLVANIA.

HEADLIGHT-LENS.

1,275,304. Specification of Letters Patent. Patented Aug. 13, 1918.

Application filed October 24, 1917. Serial No. 198,232.

*To all whom it may concern:*

Be it known that I, GEORGE W. PUFF, a citizen of the United States, residing at Jeannette Borough, in the county of Westmoreland and State of Pennsylvania, have invented certain new and useful Improvements in Headlight-Lenses, of which the following is a specification, reference being had to the accompanying drawings.

This invention relates to improvements in lenses for automobile lamps, and particularly to means for preventing glare.

In automobile lamps using a parabolic reflector, the filament of the lamp is supported at or near the focus of the reflector. Lamps of this type are objectionable for the reason that rays are directed upward, as well as directly from the lamp, and pedestrians and other car drivers using the road are dazzled by these upwardly directed rays. In many locations, the law requires that some means be provided for preventing the use of lamps throwing upwardly directed rays and this has resulted in many devices being put upon the market to overcome this difficulty, many of these devices, however, acting to reduce the light emitted by the lamps.

The general object of my invention is the provision of a headlight lens, so constructed that use shall be made of all the light emitted from the lamp, but further so constructed that there will be no glare from the lamps which will be thrown into the faces of pedestrians or other car drivers, and that the errant rays, as they are called, which are directed upward and forward from a point below the focal axis of the lamp will be deflected downward.

A further object of the invention is to provide a lens of this character in which the means for interrupting or deflecting these upwardly directed rays is formed as part of the lens itself, in the form of a rib extending across the face of the lens and acting in addition to reinforce and strengthen the lens.

A further object of the invention is the provision of a lens of this character, in which the upper half of the lens is frosted or otherwise formed to produce a diffused lighting effect, the lower half of the lens being unfrosted, and there being a transverse diametrically disposed rib of glass dividing the frosted and unfrosted portions of the lens from each other, and acting to prevent the passage of upwardly directed rays from the light and to deflect these rays downward.

Other objects will appear in the course of the following description.

My invention is illustrated in the accompanying drawings, wherein:—

Figure 1 is a vertical sectional view of an automobile headlight with my improved lens applied thereto;

Fig. 2 is an elevation of the automobile headlight and lens, showing the areas of diffused and clear light;

Fig. 3 is a face view of the lens;

Fig. 4 is a section on the line 4—4 of Fig. 3; and

Fig. 5 is a section on the line 5—5 of Fig. 3.

Referring to these figures, it will be seen that lens 10 is approximately concavo-convex in form and is provided with a flat annular margin 11. Extending diametrically across the lens in a substantially horizontal plane is a rib 12, preferably of glass, this rib having somewhat the shape of a rather flattened, narrow cap visor. The rib in plan view tapers toward its ends, that is, the middle portion $a$ of the rib at the apex of the lens, has a depth of substantially 1" and then narrows toward the extremities $b$ of the rib. This rib does not extend across the marginal portion 11. The under face of the rib, for its entire length, is slightly upwardly and inwardly inclined, and the upper face of the rib throughout its entire length extends upward and toward the surface of the lens at a slightly greater angle than the under face. The rib at its edge has a thickness at the middle $a$ of approximately ¼" and this thickness is practically constant for the entire length of the rib. It will be seen that the base of the rib is thickest at the middle and that the thickness of the base of the rib gradually becomes less toward the ends of the rib, so that the line of junction between the upper face of the rib and the body of the lens is slightly bowed upwardly.

A lens of the character above described eliminates all glare from automobile lamps for the reason that the light which passes through the upper portion of the lens is diffused and softened by the ground glass or other like surface, while the light rays which are emitted by the filament below the axis of the lens, and which are directed upward and outward, strike the rib 12 and are interrupted and there broken up or deflected downward. The lower portion of the lens, being of clear glass, permits the light rays to be directed most effectively therethrough, so as to secure the full lighting value of the lamp and permit a thoroughly good illumination of the road.

The reason for forming the lens concavo convex so that the lens projects forward from the housing or lamp is to provide for the headlight being seen from the side as well as from the front, and to admit of a better illumination of the road transversely of the latter than would be the case were the lens flat or a relatively flattened convex lens. The reason for frosting the marginal portion 11 is to prevent the margin of the lens admitting brilliant light, if the marginal clamping flange of the lamp housing does not entirely cover the marginal portion of the lens. The frosted portion of the lens throws a mild and yet clear light but there is no glare from this light or any sharp rays. As the lens is approached the light from the upper or frosted portion of the lens becomes dimmer but at no time is any glare caused from the upper portion of the lens.

Having described my invention, what I claim is:

1. A headlight lens, one-half of the lens being formed to diffuse light, the other half of the lens being of clear glass, and a member extending across the lens and dividing the clear portion of the lens from the other portion and interrupting rays directed upward and outward through the lens from a point below its axial center.

2. A headlight lens concavo-convex in form, one-half of the lens being of clear glass and the other half being formed to diffuse the light transmitted therethrough, the convex face of the lens being formed with a rib extending transversely across the lens and dividing the clear portion of the lens from the other portion, said rib projecting beyond those portions of the lens immediately above and below the rib.

3. A concavo-convex headlight lens having an integral diametrically extending rib disposed on the convex face of the lens, the under face of the rib being upwardly and inwardly inclined, the other face of the rib being beveled, the lens on one side of the rib being clear and on the other side being frosted.

4. A headlight lens having a concavo-convex body portion with a marginal flat rim, the convex face of the lens being formed with a diametrically extending rib of glass, the under face of said rib being inclined upward and toward the lens at a slight angle, the upper face of the rib being also beveled upward and toward the body of the lens, that portion of the lens below the rib being of clear glass and that portion of the lens above the rib being of frosted glass.

5. A concavo-convex headlight lens having a marginal flat flange and an integral rib on the convex face of the lens, said rib having its greatest thickness at the middle of the lens and narrowing in width toward the ends of the rib, the rib extending entirely across the convex face of the lens to the margin thereof, the upper face of the rib being inclined upward and toward the body of the lens, that portion of the lens below the rib being of clear glass and that portion above the rib being of frosted glass.

6. A concavo-convex headlight lens having a diametrically extending integral rib upon its convex face, said rib projecting downward and forward and extending diametrically across the lens.

7. A headlight lens having a member extending diametrically across it in a substantially horizontal plane, said member constituting a light deflecting hood and extending downward and forward at a slight angle.

In testimony whereof I hereunto affix my signature in the presence of two witnesses.

GEORGE W. PUFF.

Witnesses:
SAMUEL R. SORBER,
LOUIS WHITEMAN.